(12) United States Patent
Park et al.

(10) Patent No.: US 8,909,626 B2
(45) Date of Patent: *Dec. 9, 2014

(54) DETERMINING USER PREFERENCE OF ITEMS BASED ON USER RATINGS AND USER FEATURES

(71) Applicant: Yahoo! Inc., Sunnvyale, CA (US)

(72) Inventors: Seung-Taek Park, San Jose, CA (US); Wei Chu, Sunnyvale, CA (US); Todd Beaupre, Santa Monica, CA (US); Deepak K. Agarwal, Sunnyvale, CA (US); Scott Roy, Palo Alto, CA (US); Raghu Ramakrishnan, Santa Clara, CA (US)

(73) Assignee: Yahoo! Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/660,175

(22) Filed: Oct. 25, 2012

(65) Prior Publication Data

US 2013/0054593 A1 Feb. 28, 2013

Related U.S. Application Data

(63) Continuation of application No. 12/416,036, filed on Mar. 31, 2009, now Pat. No. 8,301,624.

(51) Int. Cl.
*G06F 17/30* (2006.01)

(52) U.S. Cl.
CPC .............................. *G06F 17/30699* (2013.01)
USPC .................. 707/723; 707/754; 707/E17.059

(58) Field of Classification Search
CPC .................. G06F 17/30864; G06F 17/30867; G06F 17/30699; G06F 17/30029; G06Q 30/02
USPC ............ 707/723, 802, 999.005, 754, E17.059
IPC ................. G06F 17/30699,17/30867, 17/30029
See application file for complete search history.

(56) References Cited

U.S. PATENT DOCUMENTS

| | | |
|---|---|---|
| 5,446,891 A | 8/1995 | Kaplan et al. |
| 5,727,129 A | 3/1998 | Barrett et al. |

(Continued)

OTHER PUBLICATIONS

Park et al., "Pairwise Preference Regression for Cold-start Recommendation", In RecSys' 09, Oct. 23-25, 2009, pp. 21-28.*

(Continued)

*Primary Examiner* — Phuong Thao Cao
(74) *Attorney, Agent, or Firm* — Hickman Palermo Truong Becker Bingham Wong LLP; Daniel D. Ledesma (57) ABSTRACT

A set of item-item affinities for a plurality of items is determined based on collaborative-filtering techniques. A set of an item's nearest neighbor items based on the set of item-item affinities is determined. A set of user feature-item affinities for the plurality of items and a set of user features is determined based on least squared regression. A set of a user feature's nearest neighbor items is determined based in part on the set of user feature-item affinities. Compatible affinity weights for nearest neighbor items of each item and each user feature are determined. Based on user features of a user and items a user has consumed, a set of nearest neighbor items are identified as a set of candidate items, and affinity scores of candidate items are determined. Based on the affinity scores, a candidate item from the set of candidate items is recommended to the user.

22 Claims, 6 Drawing Sheets

(56) References Cited

U.S. PATENT DOCUMENTS

| | | | |
|---|---|---|---|
| 5,754,938 A | 5/1998 | Herz et al. | |
| 5,754,939 A | 5/1998 | Herz et al. | |
| 5,761,662 A | 6/1998 | Dasan | |
| 5,835,087 A | 11/1998 | Herz et al. | |
| 5,890,152 A | 3/1999 | Rapaport et al. | |
| 5,918,014 A | 6/1999 | Robinson | |
| 5,937,397 A | 8/1999 | Callaghan | |
| 6,029,195 A | 2/2000 | Herz | |
| 6,049,777 A * | 4/2000 | Sheena et al. | 705/7.32 |
| 6,092,049 A * | 7/2000 | Chislenko et al. | 705/7.29 |
| 6,112,186 A * | 8/2000 | Bergh et al. | 705/7.32 |
| 6,134,532 A * | 10/2000 | Lazarus et al. | 705/14.25 |
| 6,202,058 B1 | 3/2001 | Rose et al. | |
| 6,438,579 B1 * | 8/2002 | Hosken | 709/203 |
| 6,728,706 B2 | 4/2004 | Aggarwal et al. | |
| 7,013,238 B1 | 3/2006 | Weare | |
| 7,050,992 B1 | 5/2006 | Bowaman et al. | |
| 7,478,035 B1 | 1/2009 | Wrench et al. | |
| 7,574,422 B2 * | 8/2009 | Guan et al. | 1/1 |
| 7,584,171 B2 * | 9/2009 | Guan et al. | 1/1 |
| 7,590,616 B2 * | 9/2009 | Guan et al. | 1/1 |
| 7,636,677 B1 * | 12/2009 | McGonigal et al. | 705/26.7 |
| 7,739,280 B2 | 6/2010 | Aravamudan et al. | |
| 7,747,620 B2 * | 6/2010 | Beaupre | 707/734 |
| 7,801,891 B2 | 9/2010 | Hu et al. | |
| 7,835,998 B2 | 11/2010 | Arvamudan et al. | |
| 7,885,904 B2 | 2/2011 | Arvamudan et al. | |
| 7,970,762 B2 | 6/2011 | Goronzy et al. | |
| 7,984,004 B2 | 7/2011 | Andrew et al. | |
| 8,001,132 B2 * | 8/2011 | Koren et al. | 707/751 |
| 8,005,833 B2 | 8/2011 | Adar et al. | |
| 8,037,067 B1 | 10/2011 | Schnedler et al. | |
| 8,037,080 B2 * | 10/2011 | Koren | 707/754 |
| 8,055,663 B2 | 11/2011 | Tsai et al. | |
| 8,095,523 B2 * | 1/2012 | Brave et al. | 707/705 |
| 8,117,212 B2 * | 2/2012 | Tateno et al. | 707/749 |
| 8,234,231 B2 * | 7/2012 | Kelly | 706/46 |
| 8,301,623 B2 * | 10/2012 | Chakrabarti et al. | 707/723 |
| 8,316,020 B1 | 11/2012 | Kleinmann | |
| 8,380,562 B2 * | 2/2013 | Toebes et al. | 705/14.26 |
| 2002/0062247 A1 | 5/2002 | Allen | |
| 2002/0116291 A1 * | 8/2002 | Grasso et al. | 705/27 |
| 2002/0178057 A1 * | 11/2002 | Bertram et al. | 705/14 |
| 2002/0186867 A1 * | 12/2002 | Gutta et al. | 382/116 |
| 2003/0027823 A1 * | 2/2003 | Cereda et al. | 514/234.5 |
| 2003/0028457 A1 * | 2/2003 | Costa et al. | 705/35 |
| 2003/0061239 A1 | 3/2003 | Yoon | |
| 2003/0088480 A1 * | 5/2003 | Berghofer et al. | 705/26 |
| 2003/0105682 A1 * | 6/2003 | Dicker et al. | 705/27 |
| 2003/0110181 A1 * | 6/2003 | Schuetze et al. | 707/103 R |
| 2004/0254911 A1 * | 12/2004 | Grasso et al. | 707/1 |
| 2005/0165832 A1 * | 7/2005 | Adam Barry et al. | 707/103 R |
| 2006/0010029 A1 | 1/2006 | Gross | |
| 2006/0026048 A1 * | 2/2006 | Kolawa et al. | 705/7 |
| 2006/0041548 A1 | 2/2006 | Parsons et al. | |
| 2006/0053065 A1 | 3/2006 | Bowman et al. | |
| 2006/0149710 A1 | 7/2006 | Koningstein et al. | |
| 2006/0195516 A1 * | 8/2006 | Beaupre | 709/203 |
| 2006/0282304 A1 * | 12/2006 | Bedard et al. | 705/10 |
| 2007/0226374 A1 * | 9/2007 | Quarterman et al. | 709/250 |
| 2007/0260624 A1 | 11/2007 | Chung et al. | |
| 2007/0266025 A1 | 11/2007 | Wagner et al. | |
| 2007/0276826 A1 * | 11/2007 | Chand et al. | 707/6 |
| 2007/0277205 A1 | 11/2007 | Grannan | |
| 2008/0077574 A1 | 3/2008 | Gross | |
| 2008/0077575 A1 * | 3/2008 | Tateno et al. | 707/5 |
| 2008/0120287 A1 * | 5/2008 | Guan et al. | 707/5 |
| 2008/0120288 A1 * | 5/2008 | Guan et al. | 707/5 |
| 2008/0120339 A1 * | 5/2008 | Guan et al. | 707/104.1 |
| 2008/0126303 A1 | 5/2008 | Park et al. | |
| 2008/0208884 A1 * | 8/2008 | Barry et al. | 707/101 |
| 2008/0235216 A1 * | 9/2008 | Ruttenberg | 707/5 |
| 2009/0037355 A1 * | 2/2009 | Brave et al. | 706/45 |
| 2009/0037410 A1 | 2/2009 | Jones et al. | |
| 2009/0055257 A1 * | 2/2009 | Chien et al. | 705/14 |
| 2009/0083258 A1 * | 3/2009 | Koren et al. | 707/5 |
| 2009/0138326 A1 | 5/2009 | Shi | |
| 2009/0144780 A1 * | 6/2009 | Toebes et al. | 725/87 |
| 2009/0171763 A1 | 7/2009 | Dong et al. | |
| 2009/0187515 A1 | 7/2009 | Andrew et al. | |
| 2009/0234784 A1 | 9/2009 | Buriano et al. | |
| 2009/0265290 A1 | 10/2009 | Ciaramita et al. | |
| 2009/0271256 A1 | 10/2009 | Toebes et al. | |
| 2009/0299945 A1 | 12/2009 | Hangartner | |
| 2009/0300547 A1 * | 12/2009 | Bates et al. | 715/825 |
| 2009/0307296 A1 * | 12/2009 | Gibbs et al. | 709/201 |
| 2009/0327193 A1 | 12/2009 | Eronen et al. | |
| 2010/0030717 A1 | 2/2010 | Agarwal et al. | |
| 2010/0030764 A1 | 2/2010 | Koren | |
| 2010/0042577 A1 * | 2/2010 | Rinearson | 706/56 |
| 2010/0070454 A1 * | 3/2010 | Masuda et al. | 706/54 |
| 2010/0088151 A1 * | 4/2010 | Kim et al. | 705/10 |
| 2010/0131863 A1 * | 5/2010 | Wexler et al. | 715/753 |
| 2010/0153411 A1 | 6/2010 | Toebes et al. | |
| 2010/0166339 A1 * | 7/2010 | Gokturk et al. | 382/305 |
| 2010/0241625 A1 | 9/2010 | Arvamudan et al. | |
| 2010/0250556 A1 * | 9/2010 | Park et al. | 707/749 |
| 2010/0268661 A1 * | 10/2010 | Levy et al. | 705/347 |
| 2010/0293160 A1 | 11/2010 | Arvamudan et al. | |
| 2011/0016121 A1 | 1/2011 | Sambrani | |
| 2011/0055209 A1 | 3/2011 | Novac et al. | |
| 2011/0107260 A1 * | 5/2011 | Park et al. | 715/811 |
| 2011/0112981 A1 * | 5/2011 | Park et al. | 705/347 |
| 2011/0184977 A1 * | 7/2011 | Du et al. | 707/769 |

OTHER PUBLICATIONS

Vucetic et al., "Collaborative Filtering Using a Regression-Based Approach", Knowledge and Information System (2005) 7: pp. 1-22, 2005.*

Linden et al. "Amazon.com Recommendations—Item-to-Item Collaborative Filtering", Industry Report, published by the IEEE Computer Society, Jan.-Feb. 2003, pp. 76-80.*

Symeonidis et al., "Feature-Weighted User Model for Recommender Systems", User Modeling 2007, Lecture Notes in Computer Science, vol. 4511, 2007, pp. 97-106.*

Yu et al., "Collaborative Ordinal Regression", An IP.com Prior Art Database Technical Disclosure, copyright by SIEMENS AG, 2006, pp. 1-6.*

Fong, S. et al., "Using Generic Algorithm for Hybrid modes of Collaborative Filtering in Online Recommenders", *Proceedings of the Eighth International Conference on Hybrid Intelligent Systems*, 2008 (8 pages).

Symeonidis et al., "Justified Recommendation based on Content and Rating data", *In Proceedings of WebKDD 2008, 2008KDD Workshop in Web Mining and Web Usage Analysis*, Las Vegas, NV, Aug. 2008 (14 pages).

Pazzani, "A Framework for Collaborative, Content-based and Demographic Filtering", *Artificial Intelligence Review* 13: pp. 393-408 (16 pages) 1999.

Wang et al., "Unifying User-based and Item-based Collaborative Filtering Approaches by Similarity Fusion", *SIGIR'06*, Aug. 6-11, 2006, Seattle, Washington, USA (8 pages).

Bell et al., "Modeling Relationships at Multiple Scales to Improve Accuracy of Large Recommender Systems", *KDD'07*, Aug. 12-15, 2007, San Jose, California, USA, pp. 95-104 (10 pages).

International Searching Authority, International Search Report for PCT application No. PCT/US2010/041960 with written opinion, dated Feb. 18, 2011 (9 pages).

Current claims for PCT/US2010/041960 (4 pages).

Taiwan Intellectual Property Office, " Examination Opinions" in application No. 099121797, dated Jul. 19, 2013, 7 pages.

Current Claims in application No. 099121797, dated Jul. 2013, 4 pages.

* cited by examiner

|  | item 1 | item 2 | item 3 | item 4 | item 5 | item 6 | item 7 | item 8 | item 9 | item 10 |  | item m |
|---|---|---|---|---|---|---|---|---|---|---|---|---|
| user 1 | 0 | 0 | 1 | 0 | 0 | 0 | 0 | 0 | 0 | 0 |  |  |
| user 2 | 0 | 0 | 1 | 1 | 0 | 1 | 1 | 0 | 0 | 1 |  |  |
| user 3 | 1 | 1 | 1 | 1 | 1 | 0 | 1 | 0 | 1 | 0 |  |  |
| user 4 | 0 | 0 | 1 | 1 | 0 | 0 | 1 | 1 | 0 | 1 |  |  |
| user 5 | 1 | 0 | 1 | 0 | 1 | 1 | 0 | 1 | 0 | 0 |  |  |
| user 6 | 0 | 1 | 0 | 1 | 1 | 1 | 0 | 1 | 0 | 0 |  |  |
| user 7 | 0 | 1 | 1 | 1 | 1 | 1 | 0 | 1 | 0 | 0 |  |  |
| user 8 | 0 | 1 | 0 | 0 | 1 | 0 | 0 | 1 | 0 | 0 |  |  |
| user 9 | 1 | 0 | 0 | 0 | 0 | 1 | 0 | 0 | 1 | 0 |  |  |
|  |  |  |  |  |  |  |  |  |  |  |  |  |
| user n |  |  |  |  |  |  |  |  |  |  |  |  |

Fig. 2

|        | item 1 | item 2 | item 3 | item 4 | item 5 | item 6 | item 7 | item 8 | item 9 |  | item n |
|--------|--------|--------|--------|--------|--------|--------|--------|--------|--------|--|--------|
| item 1 | x      | 0.2    | 0.9    | 0.3    | 0.0    | 0.5    | 0.8    | 0.7    | 0.9    |  |        |
| item 2 | 0.2    | x      |        |        |        |        |        |        |        |  |        |
| item 3 | 0.9    |        | x      |        |        |        |        |        |        |  |        |
| item 4 | 0.3    |        |        | x      |        |        |        |        |        |  |        |
| Item 5 | 0.0    |        |        |        | x      |        |        |        |        |  |        |
| item 6 | 0.5    |        |        |        |        | x      |        |        |        |  |        |
| item 7 | 0.8    |        |        |        |        |        | x      |        |        |  |        |
| item 8 | 0.7    |        |        |        |        |        |        | x      |        |  |        |
| item 9 | 0.9    |        |        |        |        |        |        |        | x      |  |        |
|        |        |        |        |        |        |        |        |        |        |  |        |
| item n |        |        |        |        |        |        |        |        |        |  |        |

Fig. 3

|  | item 1 | item 2 | item 3 | item 4 | item 5 | item 6 | item 7 | item 8 | item 9 | | item n |
|---|---|---|---|---|---|---|---|---|---|---|---|
| feature 1 | 4.5 | 2.4 | 6.5 | 1.8 | 2.9 | 3.2 | 0.6 | 3.1 | 1.4 | | |
| feature 2 | | | | | | | | | | | |
| feature 3 | | | | | | | | | | | |
| feature 4 | | | | | | | | | | | |
| feature 5 | | | | | | | | | | | |
| feature 6 | | | | | | | | | | | |
| | | | | | | | | | | | |
| feature f | | | | | | | | | | | |

DETERMINING USER PREFERENCE OF ITEMS BASED ON USER RATINGS AND USER FEATURES

CROSS-REFERENCE TO RELATED APPLICATIONS; BENEFIT CLAIM

This application is a Continuation of U.S. patent application Ser. No. 12/416,036, filed Mar. 31, 2009, now U.S. Pat. No. 8,301,624 issued Oct. 30, 2012, the entire contents of which is hereby incorporated by reference for all purposes as if fully set forth herein. The Applicants hereby rescind any disclaimer of claim scope in the parent application or the prosecution history thereof and advise the USPTO that the claims in this application may be broader than any claim in the parent application.

FIELD OF THE INVENTION

The present disclosure relates generally to recommender systems that present users of internet applications with recommendations, and more particularly to a recommender system that presents users of internet applications with recommendations based on the users' tracked behavior and information describing the user.

BACKGROUND OF THE INVENTION

The approaches described in this section are approaches that could be pursued, but are not necessarily approaches that have been previously conceived or pursued. Therefore, unless otherwise indicated, it should not be assumed that any of the approaches described in this section qualify as prior art merely by virtue of their inclusion in this section.

Many current internet applications utilize recommender systems to automate the process of providing recommendations for products and services that might be of interest to the user. Widely deployed on the web, such systems help users explore their interests in many domains such as movies, music, books, websites, electronics, and virtually any other type of information available on the web. The overwhelming volume of movies, music, books, etc. available makes it virtually impossible for a user to familiarize himself with all of the content, making recommendations extremely influential in the process of deciding what to consume. As a result, recommender systems appear everywhere, from independent, community-driven web sites, to large e-commerce powerhouses like Yahoo.com®. Recommender systems can improve a user's experience by personalizing what the user sees, often leading to greater engagement and loyalty. Merchants, in turn, receive more explicit preference information that paints a clearer picture of customers.

Two different designs for recommender systems are commonly adopted: content-based filtering systems and collaborative filtering systems. Content-based filtering systems use behavioral data about a user and item content information to recommend items similar to those consumed or rated by the user in the past. Items are represented as a set of item features. For example, a movie might be represented as a set of item features such as genre, actors, directors, box office, release date, average critic review ratings, average user ratings, and so on. Content-based filtering systems can generate user profiles based on the content descriptions of the items previously consumed by the user. For example, if most of the movies the user has watched are action movies starring a particular actor, then the system might heavily weight those two item features and recommend to the user other action movies with that same actor. Instead of generating a profile based on all movies the user has consumed, the profile might be based only on movies the user has positively rated, indicating that the user enjoyed those particular movies.

The system can recommend new movies to users if item features of new movies match well to the profile of the user. The system, however, does not work well, or in some cases not work at all, for new users who do not have profiles. For new users, the system may ask the user to answer a questionnaire, which may seek a variety of information such as demographic information and answers to questions such as "what kinds of genre do you like?" or "who are your favorite actors?" Based on the information from the questionnaire, the system can generate an initial profile for the user and update that profile as the user consumes new items. This method, however, often increases the burden on users which hurts user experiences and can result in a loss of users. Additionally, content-based filtering systems generally only recommend items that are similar to items previously consumed by the user. For example, if a user has watched only romance movies, then a content-based filtering system might only recommend romance movies, which can often cause low satisfaction of recommendations due to a lack of diversity for new or casual users who have not revealed many of their interests. Another limitation of content-based filtering is that its performance highly depends on the quality of item feature generation and selection.

Collaborative filtering systems typically work by associating a user with a group of like-minded users, and then recommending items enjoyed by others in the group. A significant difference between content-based filtering and collaborative filtering is that content-based filtering typically only uses a single user's information while collaborative filtering can use community information such as ratings from a group of other users who have similar tastes. Collaborative filtering has several benefits over content-based filtering. First, collaborative filtering does not require any item feature generation and selection methods and can be applied to any domains where user ratings (either explicit or implicit) are available, thus making collaborative filtering content-independent. Second, collaborative filtering can provide "serendipitous finding," whereas content-based filtering cannot. For example, even though a user has watched only romance movies, a comedy movie might be recommended to the user if most other romance movie fans also enjoyed that comedy. Collaborative filtering can capture this kind of hidden connection between items by analyzing user consumption history (or user ratings of items) over the population of users.

While content-based filtering can use a profile of an individual user, content-based filtering does not exploit profiles of other like-minded users. Although collaborative filtering often performs better than content-based filtering when a lot of user ratings are available, collaborative filtering suffers from cold-start problems where only a small amount of information is available for users or items. For example, collaborative filtering cannot make recommendations to new users due to the lack of information on new users and cannot recommend new items if no users have yet rated those new items. Also, the quality of recommendations for casual users who have consumed only a few items is typically poor because the system is making recommendations based on limited data.

A key challenge in any recommender systems, including content-based and collaborative filtering systems, is how to provide recommendations at early stages when available data is sparse. The problem is most severe when a new system launches and most users and items are new, but the problem never goes away completely as new users and items are added to the system. Therefore, there exists in the art a need for a recommender system that overcomes the disadvantages of standard content-based filtering system and standard collaborative-based filtering systems.

BRIEF DESCRIPTION OF THE DRAWINGS

The present invention is illustrated by way of example, and not by way of limitation, in the figures of the accompanying drawings.

DETAILED DESCRIPTION OF EMBODIMENTS OF THE INVENTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

Techniques described herein involve using a hybrid recommender system, which combines standard least squared linear regression and collaborative filtering techniques, to overcome the shortcomings of the prior art. Hybrid methods can be especially useful when data is sparse, for example in cold-start situations. In fact, in the extreme cold-start setting, pure collaborative filtering methods cannot provide recommendations at all, and content-based information filtering methods or hybrid methods are needed.

Figure 1A:
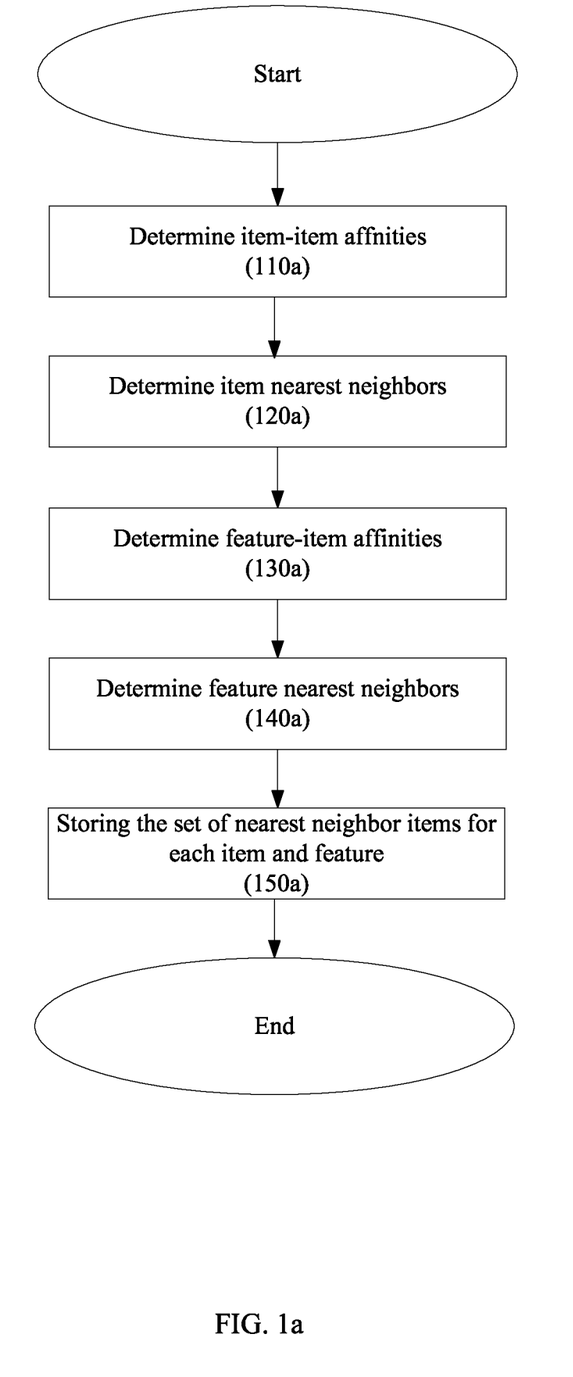
FIGS. 1a and 1b are flow charts illustrating methods embodying aspects of the present invention.

Embodiments of the present invention include a hybrid recommender system for providing recommendations. FIG. 1a is a flow chart illustrating a method that could be performed by a recommender system embodying aspects of the present invention. The method comprises determining a set of item-item affinities for a plurality of items (block 110a), wherein the item-item affinity for two items is a value corresponding to the similarity between the groups of people who like or dislike the first item and the groups of people who like or dislike the second item. The method further comprises, determining a first set of nearest neighbor items for each item or a subset of items based in part on the set of item-item affinities (block 120a), wherein the set of an item's nearest neighbors corresponds to a subset of the plurality of items that has the strongest affinity to the item. The method further comprises determining a set of user feature-item affinities between some or all of the plurality of items and a set of user features (block 130a), wherein the user feature-item affinity corresponds to the correlation between a user feature and how strongly users with that user feature in their profile like or dislike a particular item. The method further comprises determining a set of nearest neighbor items for each user feature based in part on the set of user feature-item affinities (block 140a), wherein the set of the user feature's nearest neighbors corresponds to a set of items that have the strongest affinity towards the user feature. The method further comprises storing the set of nearest neighbor items for each item and user feature in a common data structure such as a matrix and determining compatible affinity weights for both item-item affinity and user feature-item affinity (block 150a).

Figure 1B:
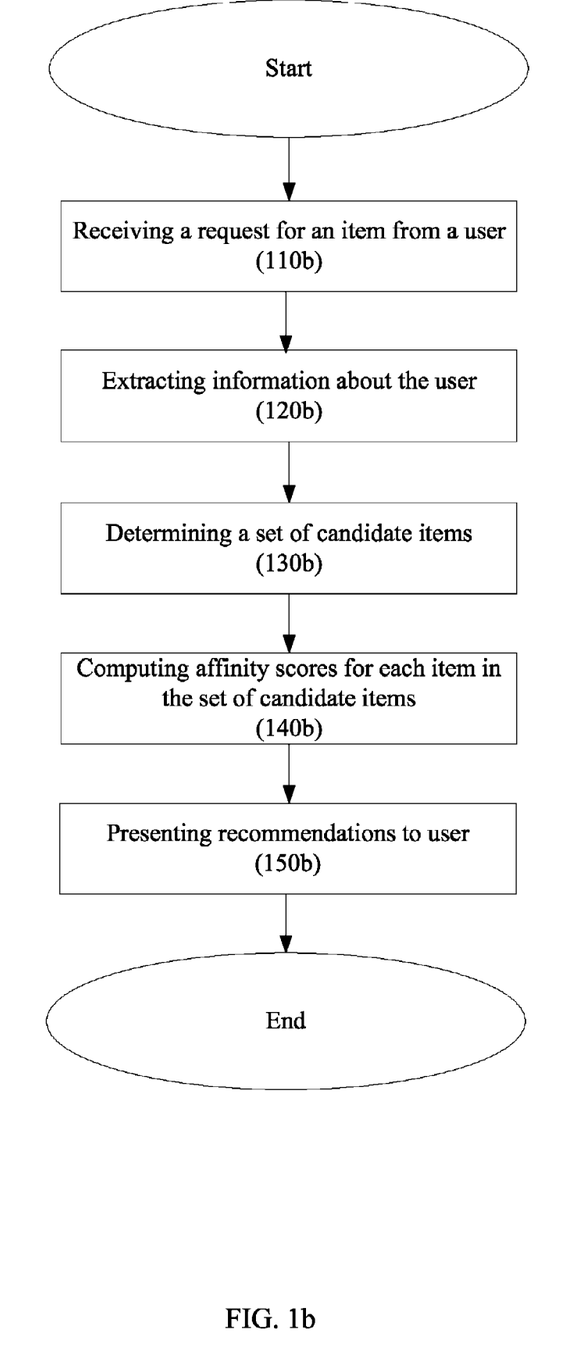

FIG. 1b is a flow chart illustrating a method that could be performed by a recommender system embodying aspects of the present invention. The method comprises receiving a request for an item from a user (block 110b) and extracting information about the user, such as user features in the user's profile and items that the user has previously requested (block 120b). The method further comprises determining a set of candidate items comprised of nearest neighbor items for each item and each user feature extracted from the user's profile (block 130b) and computing an affinity score for each item in the set of candidate items (block 140b). The extraction of nearest neighbor items to determine the set of candidate items can, for example, be based on information stored in the common data structure described in block 150a of FIG. 1a. From the set of candidate items, a subset of items can be selected and presented to the user as recommendations (block 150b).

Although the blocks in FIG. 1a and FIG. 1b have been presented in a particular order for purposes of explanation, it will be appreciated by one of ordinary skill in the art that the steps corresponding to the various blocks can be performed in a different order or performed simultaneously depending on implementation preferences. For example, the steps described in blocks 110a and 120a may be performed after or in parallel with the steps described in blocks 130a and 140a. Additionally, various aspects of the present invention can be performed either offline or in real time depending on implementation preferences. For example, various aspects of the present invention described in FIG. 1a might be performed periodically offline while aspects of FIG. 1b might be performed in real time in response to a user request.

Item-Item Affinity Computation and Finding the Top K Nearest Neighbor Items of Each Item Techniques described herein involve determining an item-item affinity for a plurality of items. Item-item affinity generally results from the similarity between the groups of users to which any two items appeal and do not appeal. For example, if the group of people who like item A substantially overlaps with the group of people who like item B, and if the group of people who dislike item A substantially overlaps with the group of people who dislike item B, then items A and B are considered to have a high or strong affinity. Conversely, if the group of people who like item A only minimally overlaps with the group of people who like item B, then items A and B can be considered to have a low or weak affinity.

Figure 2:
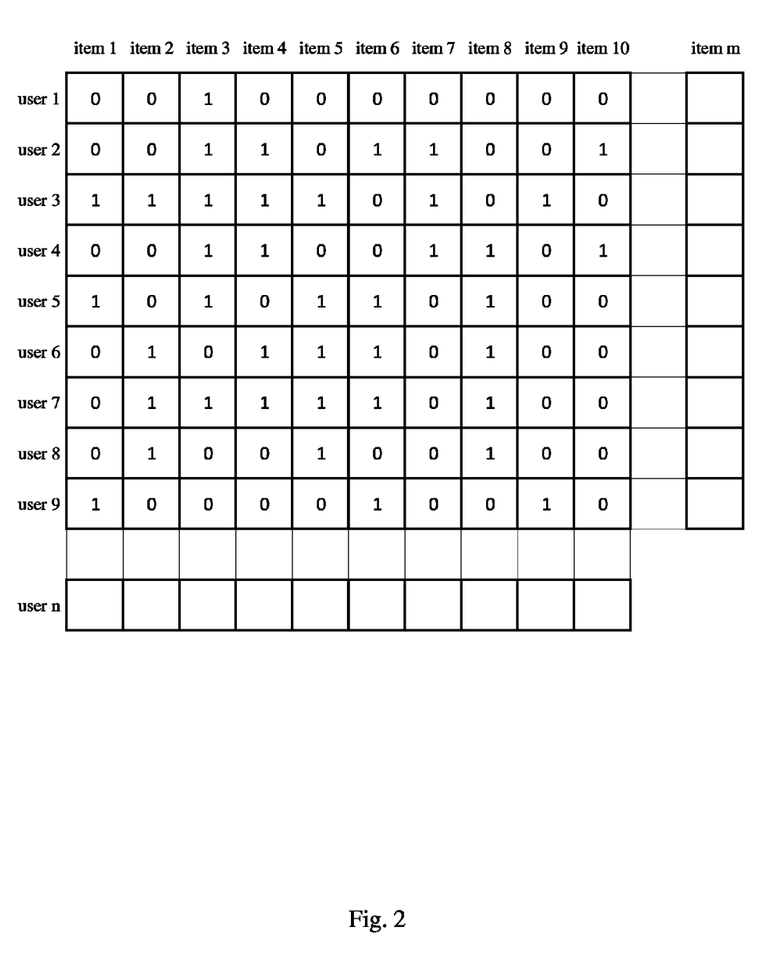
FIG. 2 is an example of a user-item matrix.

FIG. 2 shows an n-by-m user-item rating matrix (abbreviated R) where n and m denote the number of users and items. The matrix can be generated by storing user information based on information such as user-entered data or tracked behavior data. Examples of such information include whether a user added or deleted a particular item from a list, whether a user clicked or viewed a particular item, or what rating a user gave a particular item. Depending on the type of user information contained in the matrix, each entry in the matrix can be either binary or non-binary. For example, if the matrix is tracking whether or not a user clicked on a particular item, then the entry might be binary, with $R_{ui}$ equaling 1 if a user u has clicked on item i but $R_{ui}$ equaling 0 if user u has not clicked on item i. FIG. 2 shows an example of a binary matrix, but if a matrix is tracking a user's movie reviews, for example, then the entries in the matrix might be numbers between 0 and 1, 1 and 5, or 0 and 100 or any other non-binary values.

As new information about items is obtained, the user-item rating matrix, as well as the other data structures discussed in this disclosure, can be updated accordingly. Techniques employed in certain embodiments of the present invention can include either updating the user-item rating matrix in real time or not updating the user-item rating matrix in real time. For systems managing a large number of users and a large number of items, system performance might be enhanced by periodically updating the user-item rating matrix as opposed to updating the user-item rating matrix in real time.

The term "item" as used herein refers generically to any product or service, either tangible or intangible, which could be consumed by a user. For example, an item might be a module within a customizable web page, and a system embodying aspects of the present invention might be configured to recommend modules such as a sports news module, a financial news module, or a movie module to users. The term "item" can also refer to tangible products such as DVDs, clothing, or consumer electronics, or to services such as travel or financial advice. One of ordinary skill in the art will appreciate that what the term "item" can refer to in the context of this disclosure is virtually limitless.

Each user in the user-item rating matrix can be normalized such that $\Sigma_{i \in M} r'_{ui}{}^2 = 1$. Thus $r'_{ui} = r_{ui}/\sqrt{\Sigma_{j \in M} r_{uj}{}^2}$. The normalization can minimize the effects of users who rate lots of items because such users are typically not good indicators of user preferences. Thus, it is beneficial to reduce the effect of those users' ratings when similarity of items is calculated.

Item similarity can also be normalized such that $r''_{ui} = r'_{ui}/\sqrt{\Sigma_{v \in U} r'_{vi}{}^2}$. In the above equations, M represents a set of all items, and U represents a set of all users. Each column is thus a unit-length vector, making computation of cosine similarity simpler. One of ordinary skill in the art will appreciate that alternative normalization techniques such as $r''_{ui} = r_{ui} - \bar{r}_u - \bar{r}_i + \bar{r}$, where $\bar{r}_u$ is the average rating of the user u (or the fraction of items the user u has rated) and $\bar{r}_i$ is the average rating of the item i (or the fraction of users who has rated the item i). Under such an approach, $\bar{r}$ denotes the average rating (or density ratio such that what fraction of entry is filled in), and $r_{ui}$ denotes the normalized rating $r''_{ui}$ hereafter.

As each column of matrix R is a unit-length vector, the cosine similarity between an item i and item j can be defined as $\cos(i, j) = \Sigma_{u \in U} r_{ui} \cdot r_{uj}$, item i represents an item a user has consumed and item j represents a candidate item that might be recommended to the user. In some instances, the cosine similarity might be defined by few common users. For example, item i and j might have only been rated by two users each and only one common user who rated both items. In such an instance, the cosine similarity of item i and j will be 0.5. A technique of the present invention includes "penalizing" or lessening the importance given to a cosine similarity based on only a few common users. Common means of penalizing include determining:

$$\cos(i, j)' = \frac{\min(\gamma, c_{ij})}{\gamma} \cos(i, j) \text{ or } \cos(i, j)' = \frac{c_{ij}}{c_{ij} + \gamma} \cos(i, j)$$

where $c_{ij}$ and $\gamma$ are the number of common users rating both items and a shrinkage parameter. Note that if $c_{ij} \gg \gamma$, $\cos(i, j)' \cong \cos(i, j)$ and if $c_{ij} \ll \gamma$, $\cos(i, j)' \cong 0$. $\gamma$ can be determined based on cross validation testing to determine a value that provides the highest performance based on system implementation preferences, for example $\gamma = 50$.

Then for each item, the top K nearest neighbor items based on the cosine similarity can be determined. The list of nearest neighbor items of an item is a list of candidate items that have the strongest affinity towards the item. The value of K can be selected by a system designer based on implementation preferences, for example by cross-validation testing to determine a value of K that provides the best performance in offline tests, For example, K might equal 100.

Figure 3:
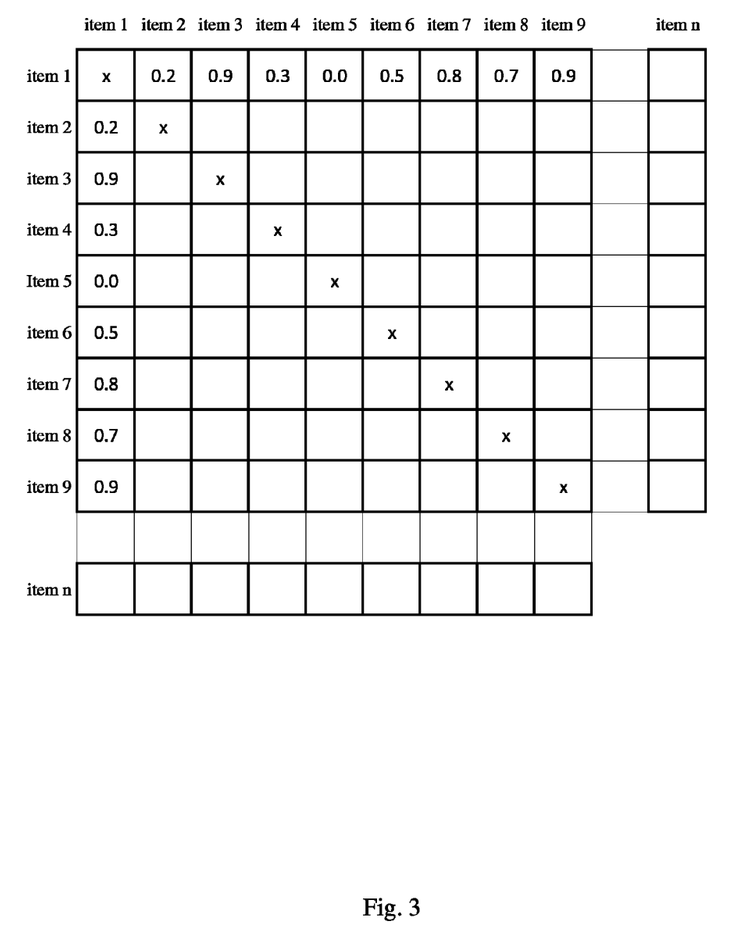
FIG. 3 is an example of a matrix storing item-item affinity values.

FIG. 3 shows an example of a matrix storing values for item-item affinities determined based on cosine similarities as described above. The item-item affinity for item 1 and item 4, for example, is 0.3. Each item does not have an affinity towards itself, as illustrated in FIG. 3 by the X at the squares corresponding to item 1-item 1, item 2-item 2, etc. For simplicity of explanation, the majority of boxes in FIG. 3 have been left blank, but in an actual system those matrix entries would likely contain a value. From the matrix, the top K nearest neighbors for an item can be determined. For example, for item 1 the top 3 nearest neighbors would be item 3, item 7, and item 9 because those items have the strongest affinity as indicated by the values in those matrix entries.

User Feature-Item Affinity Computation and Finding the Top K Nearest Neighbor Items of Each User Feature Techniques employed in certain embodiments of the present invention further include determining a user feature-item affinity for a plurality of items and a plurality of user features. User feature refer to features, such as age, gender, and geographic location, that can be used to describe a user, and user feature-item affinity generally describes the correlation between a user feature shared by a group of users and whether those users like or dislike an item. For example, if item A is disproportionately liked by female users but disproportionately disliked by male users, then item A has a stronger user feature-item affinity towards women than to men. Or alternatively, if 35% of users over the age of 55 like item A, but only 3% of users between the ages of 18 and 25 like item A, then item A has a stronger affinity towards users over the age of 55 than to users between the ages of 18 and 25.

Techniques of the present invention further include maintaining a n-by-m user-item matrix (Y), a n-by-f user profile matrix (F), and a f-by-m weight matrix (W), such that $Y \approx FW$. Matrix W stores the values corresponding to the user feature-item affinity. Y can be the same matrix as R or it can be a matrix storing alternative information. For example, Y might be generated by using module addition and deletion data. For example, $Y_{uj}$ might equal 1 if a user u has added a module j and that module has not been deleted. $Y_{uj}$ might equal -1 if the user u has deleted the module j, and $Y_{uj}$ might be empty or equal to zero if the user u has neither added nor deleted module j.

A user profile matrix (F) can contain information relating to several types of user features such as age, gender, location and BT (Behavioral Targeting) information. An example of BT information might include monitoring activity within a network, such as identifying the frequency with which a user consumes a certain item compared to other users (e.g., identifying a user as in the top 30% of Yahoo! users for frequency of reading "Yahoo! Sports"). The features of users can be selected by "support," where the "support" of a user feature means the number of users having that user feature in their profile. Depending on implementation preference, only user features of high support above a predetermined threshold such as 5% of the population might be selected. Each user feature can have a binary value. For example, age information might be based on ten age groups, meaning ten age-group user features exist and at most one of the ten age-group user features for each user will have a non-zero value. Gender information might have two user features, where male is represented as 10 and female is represented as 01. Unknown gender can be represented as 00. Geographic information might have 51 location user features if the information is based on associating a user with one of the 50 states or the District of Columbia, or might have 1000 location user features if the geographic information is based on which of the 1000 largest cities in the country a user is closest to. BT information can refer to any monitorable behavioral information that a system designer wishes to monitor, and can be either binary or non-binary, depending on the type of information. Thus, if for example, a system monitors 15 age groups, 2 genders, 1000 locations, and 200 types of BT information, then the system, in total, monitors 1217 possible user features. Each row of F can be normalized such that $\Sigma_b f_{ub}^2 = 1$ and $\Sigma_{b'} f_{ub'}^2 = 1$, where b denotes BT user features and b' denotes non-BT user features such as locations, age, and gender.

Figure 4:
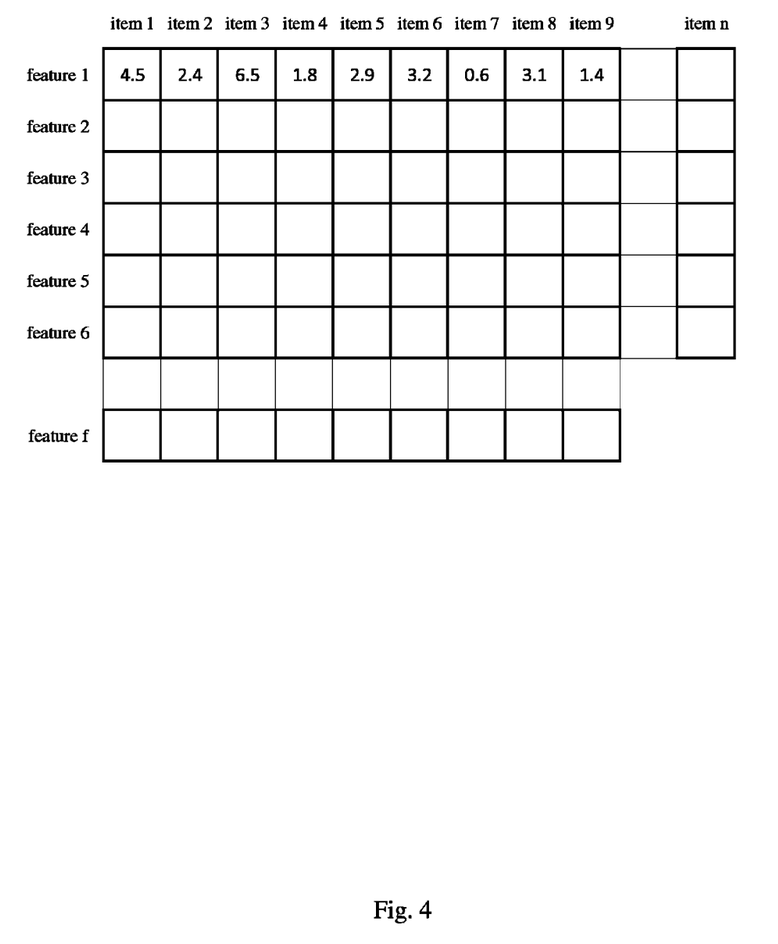
FIG. 4 is an example of a matrix storing feature-item affinity values.

Since Y and F are known, values for W can be determined by using Least Square Regression (LSR) such as by minimizing $\|Y-FW\|+c\|W\|$ where c is an arbitrary constant decided by cross-validation testing. FIG. 4 shows an example of matrix W, which stores values of user feature-item affinity based on the LSR calculation described above. After determining W, for each user feature, the top K nearest neighbor items based on $W_{fj}$ in the W matrix can be determined. Items with negative weight can be ignored.

Merging Item-Item Affinity and User Feature-Item Affinity

Techniques employed in certain embodiments of the present invention further include merging item-item affinity and user feature-item affinity to generate a recommendation to a user based on the top K nearest neighbors for each item the user has consumed and each user feature of the user, wherein the top K nearest neighbors for each item and user feature have corresponding weights. Assume, for example, that there is a user who clicked the item i and possesses user feature f. $K_i$ represents a set of the top K nearest neighbor items of the item i based on cosine similarity. $K_f$ represents a set of the top K nearest neighbors items of the user feature f based on LSR. In an example where K is equal to 100 for both item-item affinity and user feature-item affinity, Ki will consist of 100 nearest neighbor items and Kf will consist of 100 nearest neighbor items. There may be overlap between Ki and Kf such that the total number of unique items in Ki and Kf is less than 200, or there may be no overlap such that Ki and Kf will consist of 200 unique items.

Since weights of item-item (sim(i,j)) and user feature-item ($w_{fj}$) affinity are not comparable, it can be difficult to combine them to generate a recommendation. Thus, a technique employed in one embodiment of the present invention includes recalculating weights of neighbors based on the lift such as $$l_{sj} = \log_e \frac{pr(j|s)}{pr(j)}$$

where $s \in I_u \cup F_u$. $I_u$ denotes a set of items that the user u has rated. $F_u$ is a set of user features that the user u possesses. Thus, s can be either one of the user features the user possesses of or one of the items the user has rated. Additionally, pr(j) is a fraction of users who have rated the item j, and pr(j|s) is a conditional probability such as the fraction of the users having the user feature s who have also rated the item j.

It may be noted that $$\frac{pr(j|s)}{pr(j)}$$

is the same as $$\frac{N(s \cap j) \cdot N}{N(s) \cdot N(j)}$$

where N, N(j), and N(s∩j) denote the number of the total users, the number of the users who have rated an item j, and the number of the users who have user feature s and have rated the item j. Thus $l_{sj}$ can be rewritten as follows:

$$l_{sj} = \begin{cases} \log_e \frac{N(s \cap j)}{N(s) \cdot N(j)} & \text{if } j \in K_s \ \& N(s \cap j) \geq 10 \\ 0 & \text{otherwise} \end{cases}$$

If N(s∩j) is less than a value, such as 10, then candidate j might be ignored because the lift is based on too few common users, and confidence on that candidate is too low.

This kind of filtering has the additional benefit of removing noise caused by too little data from the recommendation. Additionally or alternatively, the same "penalty concept" discussed above may also be used to lower affinity weights for low confidence candidates.

If $$\frac{pr(j|s)}{pr(j)}$$

is a value greater than 1, then pr(j|s) is greater than pr(j), meaning that the percentage of users who share a user feature and rate item j is greater than the global popularity of j, and thus the value of $l_{sj}$ is positive, indicating candidate j might be a candidate to be recommended to a user. If $$\frac{pr(j|s)}{pr(j)}$$

is a value less than 1, then pr(j|s) is less than pr(j), meaning that the percentage of users who share a user feature and rate item j is less than the global popularity of j, and thus the value of $l_{sj}$ is negative, indicating candidate j might not be a candidate to be recommended to a user. Typically, a high value for $l_{sj}$ indicates a stronger probability that a user with user feature s will like candidate j. Recomputed affinity weights of nearest neighbors of each item and each user feature can be stored in a database.

Scoring Items and Generating Recommendation for a User

A system embodying techniques of the present invention can include a recommender system configured to retrieve from a user profile user features of the user and user behavior history describing what items the user has consumed or rated. The nearest neighbor items of each user feature and each item ($l_{si}$) can be extracted from the database as candidate items. Affinity scores of each candidate item can be determined as the summation of affinity weights between the candidate item and each user feature of the user and/or each item the user has consumed. For example, the affinity score of an item j for a user u can be defined as $$P_{uj} = \sum_{s \in I_u \cup F_u} I_{sj}.$$

The item or items that have the highest affinity score can then be recommended to the user.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 5:
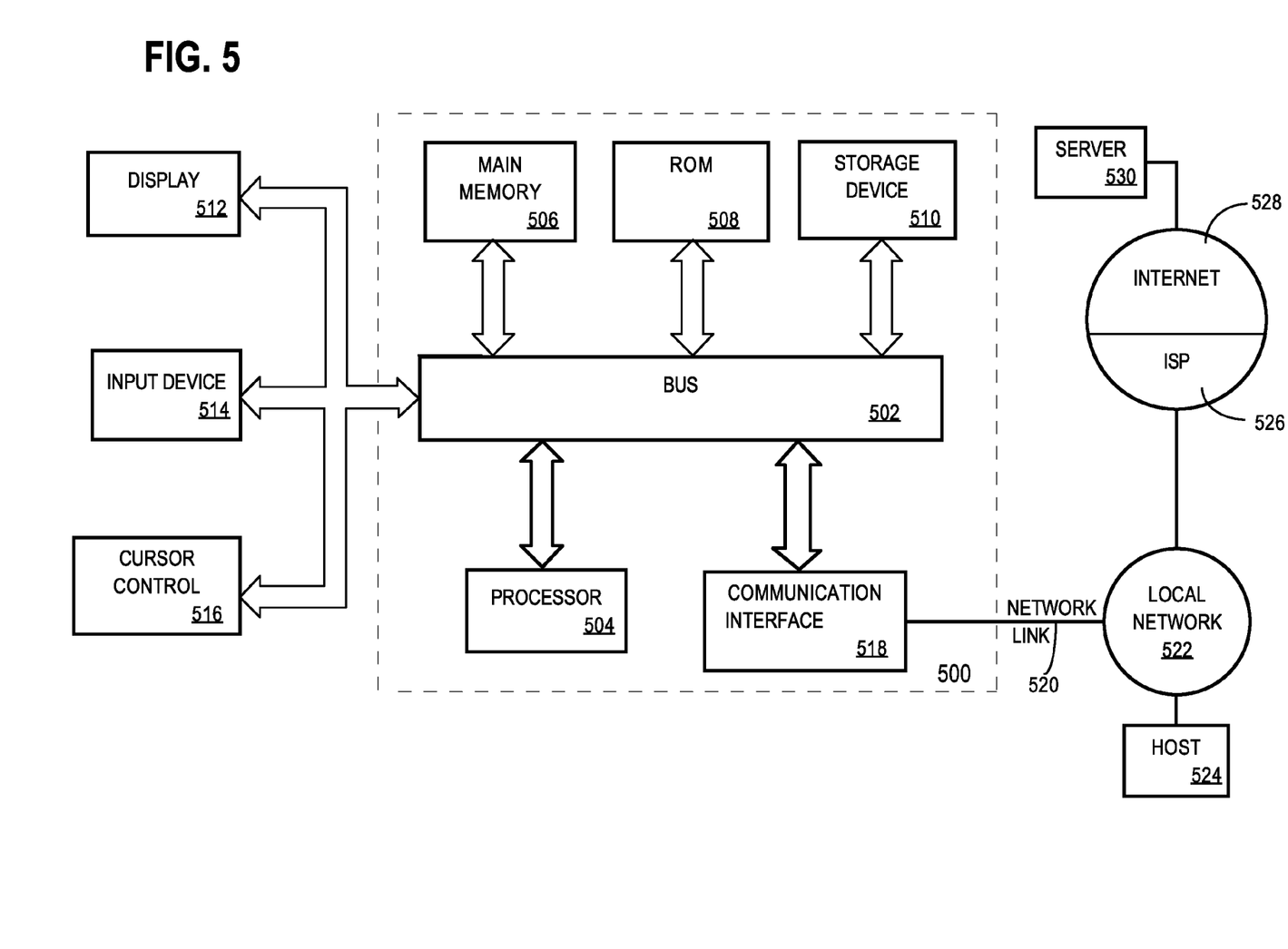
FIG. 5 is a block diagram that illustrates a computer system upon which an embodiment of the invention may be implemented.

For example, FIG. 5 is a block diagram that illustrates a computer system 500 upon which an embodiment of the invention may be implemented. Computer system 500 includes a bus 502 or other communication mechanism for communicating information, and a hardware processor 504 coupled with bus 502 for processing information. Hardware processor 504 may be, for example, a general purpose microprocessor.

Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in storage media accessible to processor 504, render computer system 500 into a special-purpose machine that is customized to perform the operations specified in the instructions.

Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any media that store data and/or instructions that cause a machine to operation in a specific fashion. Such storage media may comprise non-volatile media and/or volatile media. Non-volatile media includes, for example, optical or magnetic disks, such as storage device 510. Volatile media includes dynamic memory, such as main memory 506. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution.

Extensions and Alternatives

In this description certain process steps are set forth in a particular order, and alphabetic and alphanumeric labels may be used to identify certain steps. Unless specifically stated in the description, embodiments of the invention are not necessarily limited to any particular order of carrying out such steps. In particular, the labels are used merely for convenient identification of steps, and are not intended to specify or require a particular order of carrying out such steps.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method comprising the steps of:
   determining one or more user features of a particular user;
   using a least squares regression function to determine a set of user feature-item affinities between a plurality of items and a set of user features of users who have consumed or rated one or more of the plurality of items;
   for each user feature of the one or more user features of the particular user, determining a set of nearest neighbor items based, at least in part, on the set of user feature-item affinities and said each user features;
   determining a set of candidate items based, at least in part, on the set of nearest neighbor items for each user feature of the one or more user features of the particular user;
   causing to be presented, to a user as a recommendation, a candidate item from the set of candidate items;
   wherein the steps are performed by one or more computing devices.

2. The method of claim 1, further comprising:
   determining that the particular user has consumed or rated a first item in a set of items that were consumed or rated by a user in a set of users;
   determining a set of item-item affinities between (a) the first item and (b) a first plurality of items in the set of items;
   determining a first set of nearest neighbor items form the first plurality of items based, at least in part, on the set of item-item affinities;
   wherein the set of item-item affinities is determined by a cosine similarity function.

3. The method of claim 2, further comprising:
   determining a set of ratings of the set of items by the set of users;
   wherein the set of item-item affinities is determined at least based in part on user ratings, in the set of ratings, of the first plurality of items.

4. The method of claim 3, further comprising:
   normalizing one or more ratings by one or more users in the set of users to generate a normalized set of ratings;
   wherein determining the set of item-item affinities comprises determining the set of item-item affinities based on the normalized set of ratings.

5. The method of claim 3 further comprising:
   penalizing an item-item affinity within the set of item-item affinities if the item-item affinity is based on fewer than a minimum number of user ratings.

6. The method of claim 1, wherein at least one user feature from the one or more user features is geographic location.

7. The method of claim 1, wherein at least one user feature from the one or more user features comprises behavioral targeting information.

8. The method of claim 1, further comprising:
   recalculating a weighting of the first set of nearest neighbor items.

9. A method comprising the steps of:
   determining one or more user features of a particular user;
   determining a first item that the particular user has consumed or rated;
   determining a set of item-item affinities between (a) the first item that was consumed or rated by the particular user and (b) a first plurality of items that have been consumed or rated by one or more users in a set of users;
   determining a first set of nearest neighbor items form the first plurality of items based, at least in part, on the set of item-item affinities;
   determining a set of user feature-item affinities between a second plurality of items and the one or more user features of the particular user;
   for each user feature of the one or more user features of the particular user, determining a second set of nearest neighbor items based, at least in part on the set of user feature-item affinities and said each user feature of the particular user;
   determining a set of candidate items based, at least in part, on the first set of nearest neighbor items and the second set of nearest neighbor items for each user feature of the one or more user features of the particular user;
   determining affinity weights for the set of candidate items, wherein determining the affinity weights comprises determining an affinity weight of a candidate item bases on a number of total users, a number of users who have rated or consumed the candidate item ($N_{(j)}$), a number of users who have a particular user feature and have also rated or consumed the candidate item ($N_{(s,j)}$), and one of a number of users who have the particular user feature or a number of users who have rated or consumed another item ($N_{(s)}$);

causing to be presented, to the particular user as a recommendation, the candidate item from the set of candidate items, wherein the candidate item is determined based, at least in part, on the affinity weight of the candidate item;

wherein the steps are performed by one or more computing devices.

10. The method of claim 9, further comprising:
ignoring a second candidate item from the set of candidate items in response to $N_{(s,j)}$ being below a value.

11. The method of claim 9, wherein the particular user feature is one of gender, age range, geographic region, or online behavior.

12. One or more non-transitory machine-readable media storing instructions which, when executed by one or more processors, cause;
   determining one or more user features of a particular user;
   using a least squares regression function to determine a set of user feature-item affinities between a plurality of items and a set of user features of users who have consumed or rated one or more of the plurality of items;
   for each user feature of the one or more user features of the particular user, determining a set of nearest neighbor items based, at least in part, on the set of user feature-item affinities and said each user feature;
   determining a set of candidate items based, at least in part, on the set of nearest neighbor items for each user feature of the one or more user features of the particular user;
   causing to be presented, to the particular user as a recommendation, a candidate item form the set of candidate items.

13. The one or more non-transitory machine-readable media of claim 12, wherein the instructions, when executed by the one or more processors, further cause:
   determining that the particular user has consumed or rated a first item in a set of items that were consumed or rated by a user in a set of users;
   determining a set of item-item affinities between (a) the first item and (b) a first plurality of items in the set of items;
   determining a first set of nearest neighbor items from the first plurality of items based, at least in part, on the set of item-item affinities;
   wherein the set of item-item affinities is determined by a cosine similarity function.

14. The one or more non-transitory machine-readable media of claim 13, wherein the instructions, when executed by the one or more processors, further cause:
   determining a set of ratings of the set of items by the set of users;
   wherein the set of item-item affinities is determined at least based in part on user ratings, in the set of ratings, of the first plurality of items.

15. The one or more non-transitory machine-readable media of claim 14, wherein the instructions, when executed by the one or more processors, further cause:
   normalizing one or more ratings by one or more users in the set of users to generate a normalized set of ratings;
   wherein determining the set of item-item affinities comprises determining the set of item-item affinities based on the normalized set of ratings.

16. The one or more non-transitory machine-readable media of claim 14, wherein the instructions, when executed by the one or more processors, further cause:
   penalizing an item-item affinity within the set of item-item affinities if the item-item affinity is based on fewer than a minimum number of user ratings.

17. The one or more non-transitory machine-readable media of claim 12, wherein at least one user feature from the one or more user features is geographic location.

18. The one or more non-transitory machine-readable media of claim 12, wherein at least one user feature from the one or more user features comprises behavioral targeting information.

19. The one or more non-transitory machine-readable media of claim 12, wherein the instructions, when executed by the one or more processors, further cause:
   recalculating a weighting of the set of nearest neighbor items.

20. One or more non-transitory machine-readable media storing instructions which, when executed by one or more processors, cause:
   determining one or more user features of a particular user;
   determining a first item that the particular user has consumed or rated;
   determining a set of item-item affinities between (a) the first item that was consumed or rated by the particular user and (b) a first plurality of items that have been consumed or rated by one or more users in a set of users;
   determining a first set of nearest neighbor items from the first plurality of items based, at least in part, on the set of item-item affinities;
   determining a set of user feature-item affinities between a second plurality of items and-the one or more user features of the particular user;
   for each user feature of the one or more user features of the particular user, determining a second set of nearest neighbor items based, at least in part, on the set of user feature-item affinities and said each user feature of the particular user;
   determining a set of candidate items based, at least in part, on the first set of nearest neighbor items and the second set of nearest neighbor items for each user feature of the one or more user features of the particular user;
   determining affinity weights for the set of candidate items, wherein determining the affinity weights comprises determining an affinity weight of a candidate item based on a number of total users, a number of users who have rated or consumed the candidate item ($N_{(j)}$), a number of users who have a particular user feature and have also rated or consumed the candidate item ($N_{(s,j)}$), and one of a number of users who have the particular user feature or a number of users who have rated or consumed another item ($N_{(s)}$);
   causing to be presented, to the particular user as a recommendation, the candidate item from the set of candidate items, wherein the candidate item is determined based, at least in part, on the affinity weight of the candidate item.

21. The one or more non-transitory machine-readable media of claim 20, wherein the instructions, when executed by the one or more processors, further cause:
   ignoring a second candidate item from the set of candidate items in response to $N_{((s,j))}$ being below a value.

22. The one or more non-transitory machine-readable media of claim 20, wherein the particular user feature is one of gender, age range, geographic region, or online behavior.

* * * * *

UNITED STATES PATENT AND TRADEMARK OFFICE
CERTIFICATE OF CORRECTION

| | | |
|---|---|---|
| PATENT NO. | : 8,909,626 B2 | Page 1 of 1 |
| APPLICATION NO. | : 13/660175 | |
| DATED | : December 9, 2014 | |
| INVENTOR(S) | : Seung-Taek Park et al. | |

It is certified that error appears in the above-identified patent and that said Letters Patent is hereby corrected as shown below:

In the Claims

COLUMN 11
Claim 1: Line 60: Delete "features" and insert --feature--.

COLUMN 12
Claim 8: Line 35: Delete "first".

Claim 9: Line 44: Delete "form" and insert --from--.
Line 54: Delete "part" and insert --part,--.
Line 60: Delete "bases" and insert --based--.

COLUMN 13
Claim 12: Line 29: Delete "form" and insert --from--.

Signed and Sealed this
Tenth Day of March, 2015

Michelle K. Lee
*Deputy Director of the United States Patent and Trademark Office*